United States Patent
Yildiz et al.

(10) Patent No.: US 11,556,148 B2
(45) Date of Patent: Jan. 17, 2023

(54) FOLDABLE DISPLAY FOR AN INFORMATION HANDLING SYSTEM

(71) Applicant: Dell Products L.P., Round Rock, TX (US)

(72) Inventors: Yagiz C. Yildiz, Austin, TX (US); Stefan Peana, Austin, TX (US); Philip M. Seibert, Austin, TX (US); Kevin M. Turchin, Cedar Park, TX (US); Gerald R. Pelissier, Mendham, NJ (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/154,201

(22) Filed: Jan. 21, 2021

(65) Prior Publication Data

US 2022/0229466 A1    Jul. 21, 2022

(51) Int. Cl.
*G06F 1/16* (2006.01)
*G09G 3/34* (2006.01)
(Continued)

(52) U.S. Cl.
CPC .......... *G06F 1/1618* (2013.01); *G06F 1/1641* (2013.01); *G06F 1/1652* (2013.01);
(Continued)

(58) Field of Classification Search
CPC .... G06F 1/1652; G06F 1/1616; G06F 1/1677; G06F 1/1618; G06F 1/1681;
(Continued)

(56) References Cited

U.S. PATENT DOCUMENTS

| 10,997,893 | B1* | 5/2021 | Lee | G09G 3/3225 |
| 2014/0062856 | A1* | 3/2014 | Lu | G06F 3/14 |
| | | | | 345/156 |

(Continued)

OTHER PUBLICATIONS

Tan, Guanjun, et al. "Analysis and optimization on the angular color shift of RGB OLED displays." *Optics Express* 25.26 (2017): 33629-33642, 2017.

*Primary Examiner* — Dismery Mercedes
(74) *Attorney, Agent, or Firm* — McDermott Will & Emery LLP

(57) ABSTRACT

In one embodiment, a method for managing visual uniformity in a foldable display includes identifying a hinge angle of the foldable display, the hinge angle indicating a degree to which the foldable display is opened or closed; receiving surface curvature data from a plurality of sensors of the foldable display, the surface curvature data indicating a mechanical state of a surface of the foldable display; accessing a plurality of surface maps stored in a display database of the foldable display, each of the plurality of surface maps indicating one or more display settings associated with a respective mechanical state of the surface of the foldable display; retrieving the one or more display settings from the display database based on the hinge angle and the surface curvature data; and causing a plurality of pixels to illuminate using the one or more display settings.

17 Claims, 5 Drawing Sheets

(51) Int. Cl.
*G09G 3/00* (2006.01)
*G09G 3/20* (2006.01)
*G06F 3/04886* (2022.01)
*G09G 3/3233* (2016.01)

(52) U.S. Cl.
CPC .......... *G06F 1/1675* (2013.01); *G06F 1/1681* (2013.01); *G06F 3/04886* (2013.01); *G09G 3/035* (2020.08); *G09G 3/2003* (2013.01); *G09G 3/3233* (2013.01); *G09G 3/3406* (2013.01); *G06F 2203/04102* (2013.01); *G09G 2300/0866* (2013.01); *G09G 2320/0233* (2013.01); *G09G 2320/0626* (2013.01); *G09G 2320/0666* (2013.01); *G09G 2320/0686* (2013.01)

(58) Field of Classification Search
CPC ......... G06F 1/3231; G06F 2203/04102; G06F 2203/04105; G06F 3/0488; G06F 3/04886; G06F 3/0414; G06F 2200/1637; G06F 1/1641; G06F 1/1647; G06F 3/0412; G06F 3/147; G09G 2380/02; G09G 2354/00; G09G 3/035; G09G 3/2074; G09G 3/20; G09G 3/3233; G09G 3/3225; G09G 3/2003; G09G 3/3666; G09G 2300/0866; G09G 2300/026; G09G 2320/0686; G09G 2320/0233; G09G 2320/0666; G09G 2320/0626; G09G 2320/0646; G09G 2320/0271
See application file for complete search history.

(56) References Cited

U.S. PATENT DOCUMENTS

| | | | |
|---|---|---|---|
| 2014/0210737 A1* | 7/2014 | Hwang | H04M 1/0243 345/173 |
| 2016/0034047 A1* | 2/2016 | Lee | G06F 3/013 345/156 |
| 2016/0093240 A1* | 3/2016 | Aurongzeb | G09G 3/00 345/590 |
| 2018/0082632 A1* | 3/2018 | Lee | G09G 3/3233 |
| 2019/0005879 A1* | 1/2019 | Shin | G09G 3/003 |
| 2020/0357362 A1* | 11/2020 | Shin | G09G 3/035 |
| 2021/0247805 A1* | 8/2021 | Min | H04M 1/0243 |
| 2021/0248942 A1* | 8/2021 | Yoon | G01B 7/30 |
| 2021/0294926 A1* | 9/2021 | Duffy | G06F 1/1618 |
| 2022/0014728 A1* | 1/2022 | Deighton | G09F 9/33 |

* cited by examiner

FOLDABLE DISPLAY FOR AN INFORMATION HANDLING SYSTEM

BACKGROUND

Field of the Disclosure

The disclosure relates generally to information handling systems, and in particular to a foldable display for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed foldable display for an information handling system includes: a display database; a plurality of pixels; a plurality of sensors; a display controller; and a memory medium coupled to the display controller that includes instructions executed by the display controller causing the foldable display to: identify a hinge angle of the foldable display, the hinge angle indicating a degree to which the foldable display is opened or closed; receive surface curvature data from the plurality of sensors, the surface curvature data indicating a mechanical state of a surface of the foldable display; access a plurality of surface maps stored in the display database, each of the plurality of surface maps indicating one or more display settings associated with a respective mechanical state of the surface of the foldable display; retrieve the one or more display settings from the display database based on the hinge angle and the surface curvature data; and cause the plurality of pixels to illuminate using the one or more display settings.

In one or more of the disclosed embodiments, the instructions further cause the foldable display to: identify a viewing position of a user in relation to the surface of the foldable display; retrieve one or more additional display settings from the display database based on the viewing position of the user; and cause the plurality of pixels to illuminate using the one or more additional display settings.

In one or more of the disclosed embodiments, to cause the plurality of pixels to illuminate using the one or more display settings, the instructions further cause the foldable display to: determine that the one or more display settings cause a subset of pixels of the plurality of pixels to illuminate at a maximum brightness level; generate one or more adjusted display settings based on the maximum brightness level and the one or more display settings; cause the plurality of pixels to illuminate at a decreased brightness level, the decreased brightness level less than the maximum brightness level; and cause the subset of pixels to illuminate at an increased brightness level using the one or more adjusted display settings.

In one or more of the disclosed embodiments, the display settings include a brightness setting and a color setting.

In one or more of the disclosed embodiments, each of the plurality of surface maps stored in the display database corresponds to a respective hinge angle of a plurality of hinge angles of the foldable display.

In one or more of the disclosed embodiments, the foldable display includes of a plurality of display zones, each of the plurality of display zones encompassing a subset of the plurality of pixels of the foldable display.

In one or more of the disclosed embodiments, each of the plurality of display zones includes a sensor of the plurality of sensors, the sensor embedded underneath the surface of the foldable display.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
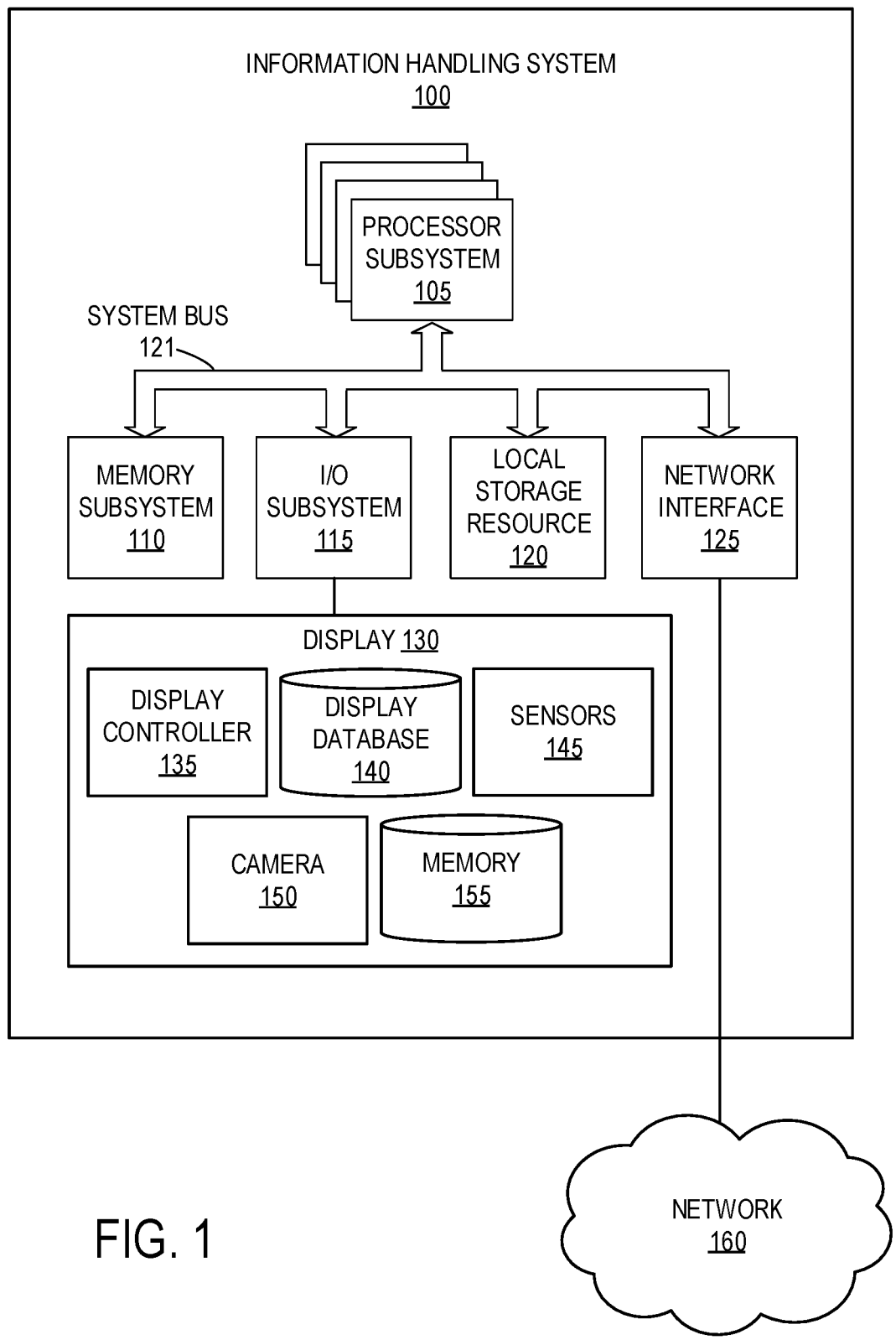
FIG. 1 is a block diagram of selected elements of an embodiment of a computing environment that includes a foldable display.

This document describes a foldable display that includes a display controller configured to: identify a hinge angle of the foldable display, the hinge angle indicating a degree to which the foldable display is opened or closed; receive surface curvature data from a plurality of sensors, the surface curvature data indicating a mechanical state of a surface of the foldable display; access a plurality of surface maps stored in a display database, each of the plurality of surface maps indicating one or more display settings associated with a respective mechanical state of the surface of the foldable display; retrieve the one or more display settings from the display database based on the hinge angle and the surface curvature data; and cause the plurality of pixels to illuminate using the one or more display settings.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2A:
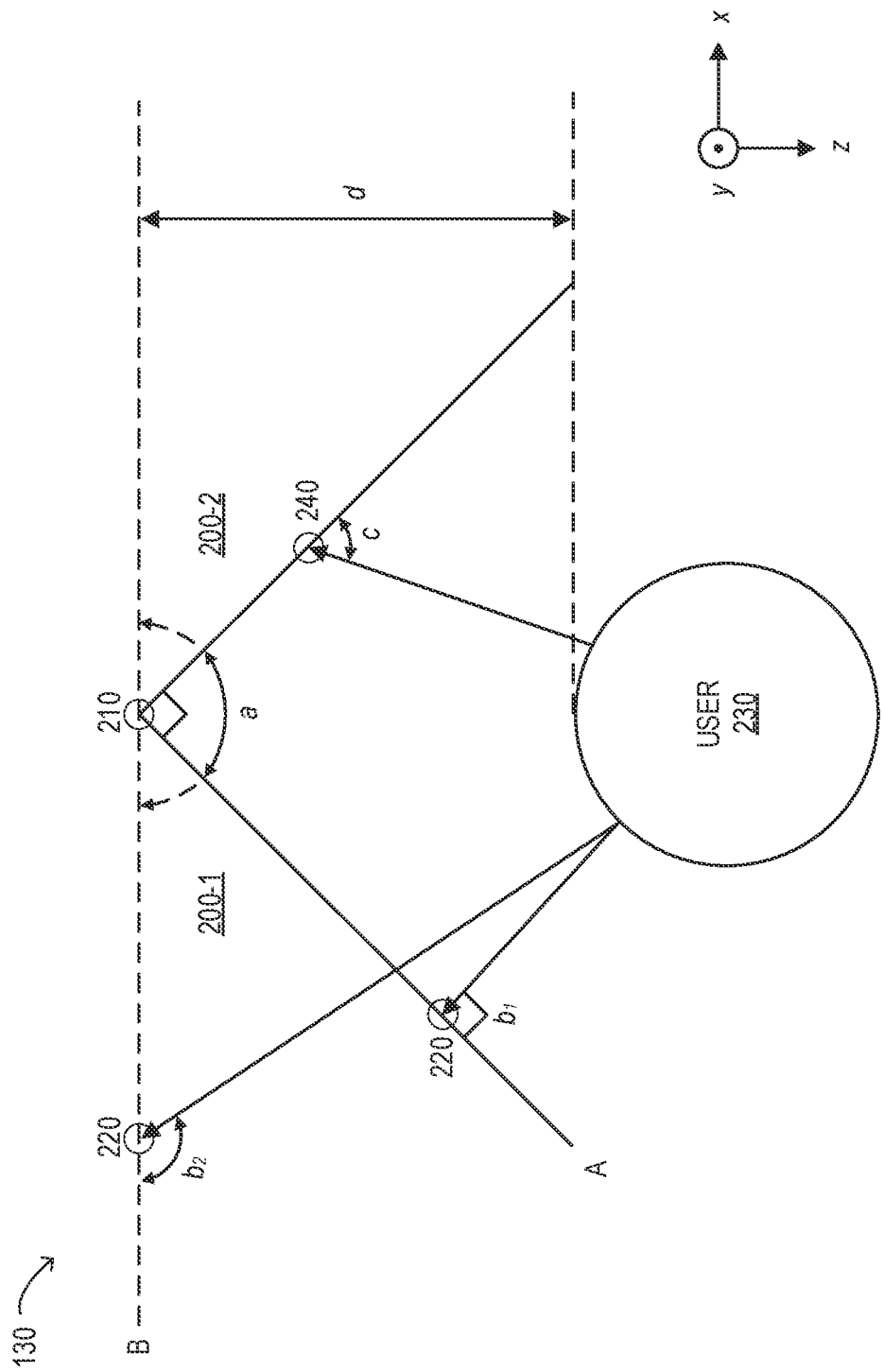
FIG. 2A is a block diagram of selected elements of an embodiment of a foldable display that includes multiple hinge angles.
Figure 2B:
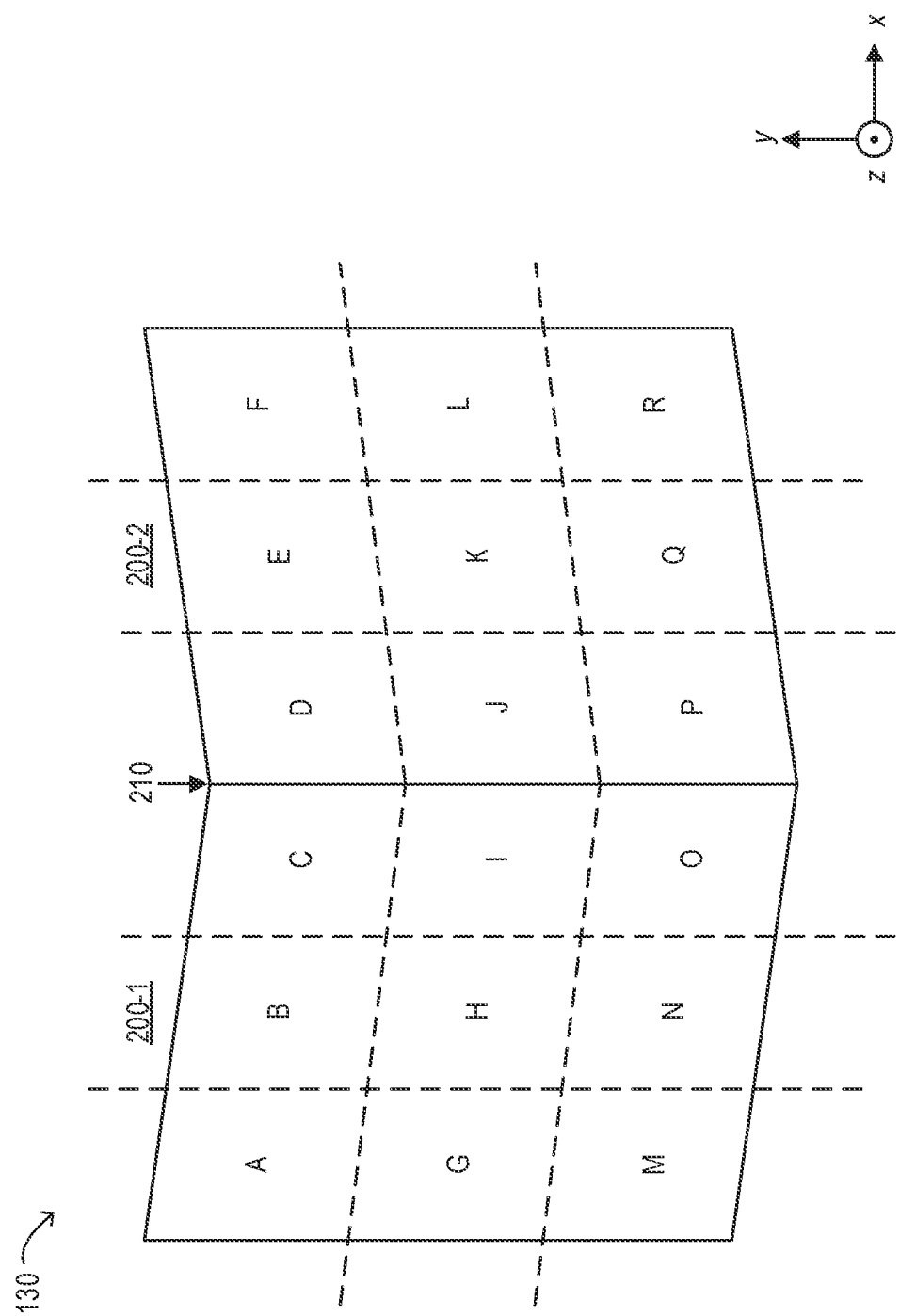
FIG. 2B is a block diagram of selected elements of an embodiment of a foldable display that includes multiple display zones.
Figure 2C:
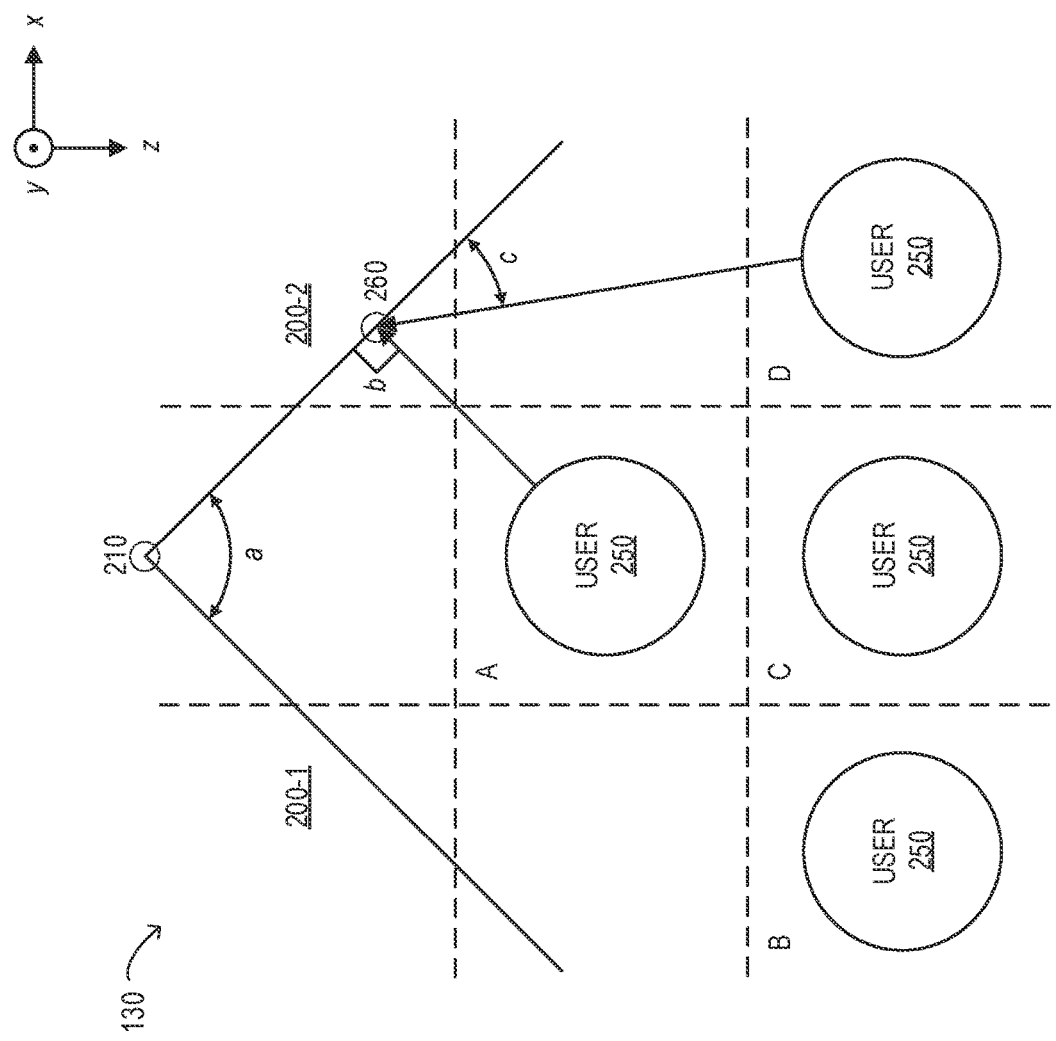
FIG. 2C is a block diagram of selected elements of an embodiment of a foldable display and multiple viewing positions of a user.
Figure 3:
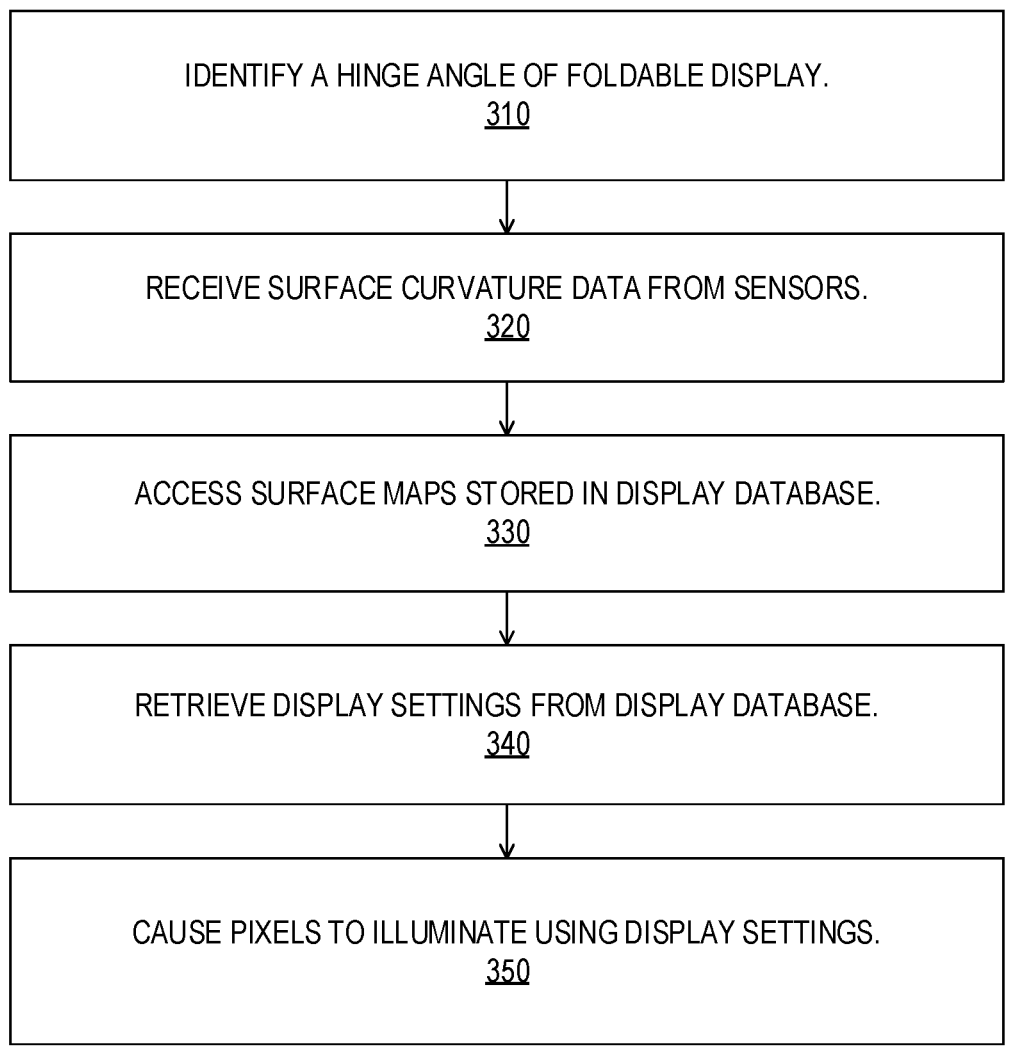
FIG. 3 is a flowchart depicting selected elements of an embodiment of a method for managing visual uniformity in a foldable display.

Particular embodiments are best understood by reference to FIGS. 1-3 wherein like numbers are used to indicate like and corresponding parts.

Turning now to the drawings, FIG. 1 illustrates a block diagram depicting selected elements of a foldable information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 110, an I/O subsystem 115 communicatively coupled to a display 130, a local storage resource 120, and a network interface 125. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In one embodiment, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 110 and/or another component of information handling system). In the same or alternative embodiments, processor subsystem 105 may interpret and/or execute program instructions and/or process data stored remotely.

In one embodiment, memory subsystem 110 may comprise a system, device, or apparatus operable to retain and/or retrieve program instructions and/or data for a period of time (e.g., computer-readable media). Memory subsystem 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 115 may comprise a system, device, or apparatus generally operable to receive and/or transmit data to/from/within information handling system 100. I/O subsystem 115 may represent, for example, a variety of communication interfaces, graphics interfaces, video interfaces, user input interfaces, and/or peripheral interfaces. In various embodiments, I/O subsystem 115 may be used to support various peripheral devices, such as a touch panel, a display adapter, a keyboard, an accelerometer, a touch pad, a gyroscope, an IR sensor, a microphone, a sensor, or a camera, or another type of peripheral device.

In information handling system 100, display 130 may comprise a system, device, or apparatus generally operable to display information processed by information handling system 100. In particular, display 130 may be or include an output device of a foldable information handling system (e.g., information handling system 100) comprised of circuitry configured to display information to a user, a flexible casing to house the circuitry, and a power supply. Information handling system 100 may be comprised of a flexible casing coupled to display 130 such that information handling system 100 may fold, unfold, and/or become mechanically deformed in conjunction with display 130. That is, information handling system 100 and display 130 may fold, unfold, and/or become mechanically deformed in unison as a single device. Thus, references to folding, unfolding, and/or mechanical deformation disclosed herein pertaining to display 130 may also pertain to information handling system 100. In the embodiment illustrated in FIG. 1, display 130 includes a display controller 135, a display database 140, sensors 145, a camera 150, and a memory 155. In one embodiment, display 130 may be or include an Organic Light-Emitting Diode (OLED) display comprised of a flexible or foldable material (e.g., a plastic substrate). In another embodiment, display 130 may be or include an OLED display comprised of rigid or semi-rigid material (e.g., a glass substrate). In other embodiments, display 130 may be or include a top-emitting OLED display, a transparent OLED display, an LED display, and/or any other type of display suitable for displaying information processed by information handling system 100. It is noted that FIG. 1 is shown in simplified, schematic format for purposes of illustrating a clear example and other embodiments of display 130 may include additional, fewer, and/or different elements. Display 130 is described in further detail with respect to FIGS. 2A, 2B, and 2C.

In one embodiment, display controller 135 may be a suitable system, apparatus, or device operable to manage visual uniformity in display 130. Conventional foldable displays may be sensitive to mechanical deformation and/or changes in temperature. Specifically, each pixel within a conventional foldable display may be impacted by various forces (e.g., stress forces, strain forces, and the like) applied to the display, or a surface thereof, as the display is folded, unfolded, or otherwise mechanically deformed. These various forces may cause changes in the angular direction of light being emitted from respective pixels in relation to a user, thereby causing the conventional foldable display to appear irregular, or nonuniform, with respect to brightness and color settings presented on the display. In addition, changes in viewing angle of a user in relation to the conventional foldable display may cause some portions of the display to appear dimmer in brightness and/or duller in color than other portions of the display, thereby causing further irregularities in appearance. In contrast, display controller 135 may compensate for changes in, both, the angular direction of light emitted from respective pixels and viewing angle of a user by causing pixels within display 130 to illuminate according to brightness and color settings, or "display settings," that correspond to respective states of curvature, or "mechanical states," of the surface of display 130. As such, brightness and color shifts caused by various changes in the mechanical state of display 130 and/or viewing angle may appear uniform to a user of display 130. Specifically, display controller 135 may cause pixels within display 130 to illuminate using display settings, thereby mitigating irregularities in visual appearance and improving overall user experience.

In one embodiment, display controller 135 may cause pixels of display 130 to illuminate using display settings in accordance with automatic adjustments in brightness and/or color settings of display 130 caused by one or more ambient light sensors (not shown in FIG. 1) within display 130. In particular, display controller 135 may increase or decrease display settings that correspond to a mechanical state of the surface of display 130 in accordance with automatic adjustments in brightness and/or color settings caused by one or more ambient light sensors that correspond to surrounding light levels in computing environment 165. For example, display controller 135 may quantize, or otherwise restrict, display settings such that pixels may illuminate using the display settings within a user-selected minimum and maximum brightness range and/or a manufacturer preset brightness range to enhance battery performance.

In one embodiment, display controller 135 may cause pixels of display 130 to illuminate using display settings in accordance with a minimum and maximum brightness range as defined by a manufacturer of display 130 and/or inherent physical limitations of the pixels within display 130. Specifically, display controller 135 may determine that display settings may require a subset of pixels within display 130 to illuminate at, or above, a maximum brightness level. For example, the angular direction of light emitted from respective pixels of display 130 and viewing angle of a user may cause a subset of pixels within display 130 to appear 20% dimmer in brightness than the remaining set of pixels within display 130. In this example, display settings may require each of the subset of pixels to raise in brightness level by 20% to appear uniform with respect to the remaining set of pixels within display 130. However, each pixel within display 130 may be currently illuminated at 90% of its maximum brightness level. Therefore, display settings requiring the subset of pixels to raise in brightness level by 20% may cause the subset of pixels to illuminate at 110% of the maximum brightness level, thereby exceeding the maximum brightness level.

In one embodiment, display controller 135 may generate adjusted display settings to make the correction to brightness levels possible. In this embodiment, display controller 135 may generate one or more adjusted display settings based on the maximum output level and the display settings. Display controller 135 may then cause each pixel within display to illuminate at a decreased brightness level, less than the maximum brightness level, thereby lowering the average brightness level within display 130. In the example described above, display controller 135 may cause each pixel within display 130 to illuminate at 70% of its maximum brightness level rather than 90%. Display controller 135 may then cause the subset of pixels to illuminate at an increased brightness level using the adjusted display settings. For example, display controller 135 may cause the subset of pixels to illuminate at 90% of the maximum brightness level, effectively raising the brightness level by 20% to appear uniform with respect to the remaining set of pixels within display 130. Display controller 135 may cause these changes in brightness level gradually (e.g., spanning two seconds or more in duration), thus making the transition in brightness appear less salient to a user of display 130. In another embodiment, display controller 135 may simply cause the subset of pixels to illuminate at or near the maximum brightness level in accordance with the display settings. Display controller 135 is described in further detail with respect to FIGS. 2A, 2B, and 2C.

In one embodiment, each sensor 145 may comprise a system, device, or apparatus generally operable to detect and capture one or more forces (e.g., stress forces, strain forces, and the like) applied to display 130. Specifically, sensors 145 may be embedded underneath, or disposed upon, the surface of display 130 to detect and capture various forces applied to the surface of display 130 that cause the surface to change in mechanical structure. For example, various stress and/or strain forces may be applied to the surface of display 130 as display 130 is folded, unfolded, or otherwise mechanically deformed by a user. Here, sensors 145 may capture these various forces in real-time and generate data, or "surface curvature data," indicating a curvature of the surface of display 130 resulting from the various forces applied. In one embodiment, display controller 135 may use the surface curvature data generated by sensors 145, in part, to identify a mechanical state of the surface of display 130 and to apply display settings corresponding to the mechanical state, thereby mitigating potential irregularities in visual appearance as described above. In one embodiment, sensors 145 may be or include one or more strain gauges that undergo changes in electrical resistance when mechanically deformed. In this embodiment, sensors 145 may continuously detect and capture one or more forces to generate surface curvature data while display 130 is in use. In another embodiment, display 130 may be comprised of a rigid or semi-rigid material (e.g., a glass substrate), thus preventing certain portions of display 130 from becoming mechanically deformed. In this embodiment, display 130 may not include sensors 145 illustrated in FIG. 1. Sensors 145 are described in further detail with respect to FIG. 2B.

In one embodiment, display database 140 may comprise a system, device, or apparatus generally operable to store display settings that correspond to various mechanical states of the surface of display 130. In particular, display database 140 may store display settings corresponding to each pixel within display 130 such that display controller 135 may retrieve the display settings and cause the pixels within display 130 to illuminate using the display settings. In one embodiment, display database 140 may store three-dimensional (3D) mappings, or "surface maps," of the surface of display 130 in various mechanical states. Each surface map stored in display database 140 may describe a mechanical state of the surface of display 130 with respect to x, y, and z dimensions. For example, display 130 may include a hinge (e.g., hinge 210 shown in FIGS. 2A, 2B, and 2C), or other movable joint or mechanism, that allows display 130 to fold and unfold, thus causing various mechanical states of the surface of display 130 as the hinge opens and closes at different hinge angles. Here, display database 140 may store a respective surface map for each hinge angle that includes corresponding display settings for each pixel within display 130 for each hinge angle. Specifically, each surface map stored in display database 140 may indicate a brightness setting and a color setting for each pixel within the surface of display 130 corresponding to a given mechanical state of display 130. In one embodiment, each surface map stored in display database 140 may be or include a 3D mapping of display 130 for each hinge angle and/or mechanical state of display 130. For example, an optical scanner, CCD device, and/or point measurement system may be used by a manufacturer of display 130 and/or administrator of computing environment 165 to create 3D mappings for each possible hinge angle and/or mechanical state of the surface of display 130.

In one embodiment, display database 140 may be or include a repository for one or more lookup tables (LUTs) storing display settings for each pixel within display 130 corresponding to a given hinge angle, mechanical state, and/or user viewing position. For example, display database 140 may be or include a repository for one or more LUTs corresponding to surface maps for each hinge angle, or a subset of possible hinge angles, of display 130. For instance, one or more LUTs may store display settings corresponding to respective hinge angles of 0° to 180°. In another example, display database 140 may be or include a repository for one or more LUTs corresponding to surface maps for each mechanical state, or a subset of possible mechanical states, of the surface of display 130. For instance, one or more LUTs may store display settings corresponding to various states of folding, bending, or other mechanical deformation of the surface of display 130. In yet another example, display database 140 may be or include a repository for one or more LUTs corresponding to surface maps for each viewing position, or a subset of possible viewing positions, of a user in relation to the surface of display 130. For instance, one or more LUTs may store display settings corresponding to viewing positions of the user in relation to the surface of display 130 based on a user position and/or eye tracking data captured by camera 150. In other embodiments, display database 140 may be or include a repository for one or more LUTs corresponding to surface maps for additional, fewer, and/or any suitable combination of hinge angles, mechanical states, and/or user viewing positions.

In one embodiment, each LUT may be a 3D LUT comprised of three axes. Specifically, a first axis of the 3D LUT may indicate a pixel number of a pixel within display 130, a second axis may indicate a brightness setting corresponding to the pixel, and a third axis may indicate a color setting corresponding to the pixel. In this embodiment, display controller 135 may use each 3D LUT during run time to retrieve the brightness setting and the color setting (i.e., display settings) for a given pixel and to dynamically manage visual uniformity of display 130 as the surface of display 130 is folded, unfolded, and/or otherwise mechanically deformed by a user. In another embodiment, display database 140 may be or include a relational database in which surface maps and corresponding display settings are stored as entries. In other embodiments, display database 140 may be or include a centralized database, distributed database, commercial database, operational database, and/or any other database management system suitable for storing surface maps and corresponding display settings. Display database 140 is described in further detail with respect to FIGS. 2A, 2B, and 2C.

In one embodiment, camera 150 may comprise a system, device, or apparatus operable to receive and convert images into electrical signals. In particular, camera 150 may be or include a charge-coupled device (CCD) and/or complementary metal-oxide semiconductor (CMOS) image sensor configured to convert light into electrons such that information handling system 100 may use the electrons to process a digital image. In one embodiment, camera 150 may be or include a webcam embedded within, or disposed upon, the surface of display 130. For example, camera 150 may be or include a webcam operable to capture one or more images of a user of information handling system 100. Here, display controller 135 may use the one or more images of a user to determine a viewing angle of the user in relation to the surface of display 130, a viewing position of the user in relation to the surface of display 130, and/or gaze direction of the user. Camera 150 is described in further detail with respect to FIG. 2C.

In one embodiment, memory 155 may be a suitable system, apparatus, or device operable to retain and/or retrieve program instructions and/or data for a period of time (e.g., computer-readable media). Memory 155 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In one embodiment, local storage resource 120 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 125 may be a suitable system, apparatus, or device operable to serve as an interface between information handling system 100 and a network 160. Network interface 125 may enable information handling system 100 to communicate over network 160 using a suitable transmission protocol and/or standard, including, but not limited to, transmission protocols and/or standards enumerated below with respect to the discussion of network 160. Network 160 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 125 may enable wired and/or wireless communications (e.g., NFC or Bluetooth) to and/or from information handling system 100.

In particular embodiments, network 160 may include one or more routers for routing data between client information handling systems 100 and server information handling systems 100. A device (e.g., a client information handling system 100 or a server information handling system 100) on network 160 may be addressed by a corresponding network address including, for example, an Internet protocol (IP) address, an Internet name, a Windows Internet name service (WINS) name, a domain name or other system name. In particular embodiments, network 160 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 160 and its various components may be implemented using hardware, software, or any combination thereof.

FIG. 2A is a block diagram of selected elements of an embodiment of a foldable display that includes multiple hinge angles. In the embodiment illustrated in FIG. 2A, display 130 may be comprised of a rigid or semi-rigid material (e.g., a glass substrate) allowing display 130 to fold, or rotate, about hinge 210 at hinge angle a while display panels 200-1 and 200-2 remain rigid or semi-rigid. Thus, certain portions of display 130 may be prevented from becoming mechanically deformed. In the top-down perspective illustrated in FIG. 2A, position A of display 130 has a hinge angle a of 90° and position B has a hinge angle a of 180°. It is noted that FIG. 2A is shown in simplified, schematic format for purposes of illustrating a clear example and other embodiments of display 130 may include additional, fewer, and/or any combination of hinge angles a ranging from 0° to 180°.

As illustrated in FIG. 2A, user 230 is positioned in front of display 130 (along the z axis) at a fixed distance d from hinge 210. Here, differences in viewing angles of user 230 in relation to display 130 for a given hinge angle a may cause some portions of display 130 to appear irregular in brightness and/or color settings with respect to other portions of display 130. Specifically, some portions of display 130 may appear dimmer in brightness and/or duller in color than other portions of display 130 for a given hinge angle a. For example, when display 130 is in position A and user 230 views portion 240 of display panel 200-2 at acute viewing angle c, the angular direction of light emitted from respective pixels within portion 240 may be directed away from the position of user 230 at fixed distance d. This viewing angle of user 230 at position A may cause portion 240 of display 130 to appear irregular, or nonuniform, with respect to brightness and color settings of adjacent portions of display panel 200-2. In contrast, some portions of display 130 may appear brighter and/or more vivid in color as the viewing angle of user 230 becomes orthogonal in relation to the surface of display 130 for a given hinge angle a. For example, when display 130 is in position A and user 230 views portion 220 of display panel 200-1 at orthogonal viewing angle $b_1$, the angular direction of light emitted from respective pixels within portion 220 may be directed toward the position of user 230 at fixed distance d. This viewing angle of user 230 at position A may cause portion 220 to appear brighter and more vivid in color in relation to brightness and color settings of adjacent portions of display panel 200-1. However, when display 130 is oriented in position B and user 230 views the same portion 220 at obtuse viewing angle $b_2$, the angular direction of light emitted from respective pixels within portion 220 may now be directed away from the position of user 230 at fixed distance d. Thus, irregularities in brightness and/or color settings of display 130 may vary based on differences in viewing angles at fixed distance d for different hinge angles a. It is noted that the angular direction of light emitted from respective pixels at the surface of hinge 210 may be directed toward the position of user 230 at fixed distance d despite changes in hinge angle a, which may cause further irregularities with respect to brightness and color settings presented on display 130.

To compensate for irregularities in appearance caused by the viewing angles of user 230 at fixed distance d for a given hinge angle a, display controller 135 may cause pixels within display 130 to illuminate using display settings corresponding to respective hinge angles a. Because display 130 may be comprised of a rigid or semi-rigid material in the embodiment illustrated in FIG. 2A, surface curvature data generated by sensors 145 may not be needed as certain portions of display 130 may be prevented from becoming mechanically deformed. Thus, display controller 135 may simply identify a degree to which display 130 is opened or closed as indicated by hinge angle a, access surface maps corresponding to each respective hinge angle a of display 130 stored in display database 140, and retrieve display settings from display database 140 based on hinge angle a.

As described above with respect to FIG. 1, display database 140 may store one or more LUTs corresponding to surface maps for each hinge angle a, or a subset of possible hinge angles a, of display 130. For example, one or more LUTs may store display settings corresponding to hinge angles a of 0° to 180°. In another example, one or more LUTs may store display settings corresponding to a subset of hinge angles a that includes 30°, 60°, 90°, 120°, 150°, and 180°. Display settings for hinge angles a not stored in display database 140 may be interpolated from display settings corresponding to one or more adjacent hinge angles a. In the example illustrated in FIG. 2A, display controller 135 may interpolate display settings for a hinge angle a of 135° from respective display settings for hinge angles a of 90° at position A and 180° at position B. In this way, fewer display settings may be stored in display database 140, thus reducing the overall number of data points required for managing visual uniformity in display 130 across hinge angles a. Upon retrieving the display settings corresponding to the surface map for hinge angle a, display controller 135 may cause the pixels within display 130 to illuminate using the display settings. In one embodiment, display controller 135 may cause only the pixels within the portion of display 130 being viewed by user 250 to illuminate using the display settings, thus increasing overall energy efficiency of display 130. For example, display controller 135 may cause the pixels within portion 240 of display 130 shown in FIG. 2A to illuminate using the display settings while pixels within the remaining portions of display 130 illuminate using existing and/or user-selected display settings.

FIG. 2B is a block diagram of selected elements of an embodiment of a foldable display that includes multiple display zones. In the embodiment illustrated in FIG. 2B, display 130 may be comprised of a flexible material (e.g., a plastic substrate) allowing display 130 to fold, or rotate, about hinge 210 while also allowing display panels 200-1 and 200-2 to become mechanically deformed. In the embodiment illustrated in FIG. 2B, display 130 includes hinge 210 and display zones A-R disposed across display panels 200-1 and 200-2. Each display zone may encompass a subset of the pixels within display 130 and include one or more sensors 145 (shown in FIG. 1). Here, the number of sensors 145 embedded underneath, or disposed upon, the surface of display 130 within a given display zone may depend on the quantity and/or magnitude of various forces applied to the surface of display 130 within the display zone. That is, the number of sensors 145 within a given display zone may be based upon a likelihood that the surface within the display zone will change in mechanical structure in response to various forces applied. It is noted that FIG. 2B is shown in simplified, schematic format for purposes of illustrating a clear example and other embodiments of display 130 may include additional, fewer, and/or different display zones than those shown in the embodiment illustrated in FIG. 2B.

In one embodiment, display zones encompassing portions of display 130 that typically receive various forces may include a dense collection of sensors 145. For example, display zones C, D, I, J, O, and P may include a dense collection of sensors 145 given that the portions of display 130 within these display zones may fold, or rotate, about hinge 210 along they axis. Similarly, display zones G and L may include a dense collection of sensors 145 given that the portions of display 130 within these display zones may fold, unfold, or become mechanically deformed, in response to display 130 being held by a user. In contrast, display zones B, H, N, E, K, and Q may include a sparse collection of sensors 145 given that the portions of display 130 within these display zones may be less likely to receive such forces while in use. Each sensor 145 may continuously detect and capture one or more forces to generate surface curvature data while display 130 is in use.

In the embodiment illustrated in FIG. 2B, a user (e.g., user 230 shown in FIG. 2A) may be positioned in front of display 130 (along the z axis). Here, various states of folding, bending, or other mechanical deformation of the surface of display 130 within one or more display zones may cause some portions of display 130 to appear irregular in brightness and/or color settings with respect to other portions of display 130. Specifically, some portions of display 130 may appear dimmer in brightness and/or duller in color than other portions of display 130 for a given mechanical state of the surface of display 130. For example, when display 130 is in a mechanical state in which display zone A is folded, the angular direction of light emitted from respective pixels within display zone A may be directed away from the position of the user. This may cause display zone A of display 130 to appear irregular, or nonuniform, with respect to brightness and color settings of adjacent display zones of display panel 200-1. In contrast, some portions of display 130 may appear brighter and/or more vivid in color as the mechanical state of the surface of display 130 becomes orthogonal in relation to the user. For example, when display 130 is in a mechanical state in which display zone E is orthogonal in relation to the user, the angular direction of light emitted from respective pixels within display zone E may be directed toward the position of the user, causing display zone E to appear brighter and more vivid in color. Thus, irregularities in brightness and/or color settings of display 130 may vary based on differences in the angular direction of light emitted from respective pixels within each display zone A-R of display 130.

To compensate for irregularities in appearance caused by differences in the angular direction of light emitted from respective pixels within each display zone A-R, display controller 135 may cause pixels within display 130 to illuminate using display settings corresponding to respective mechanical states of display 130. Because display 130 may be comprised of a flexible material in the embodiment illustrated in FIG. 2B, display controller 135 may use the surface curvature data generated by sensors 145, in part, to identify a mechanical state of the surface of display 130. Display controller 135 may additionally identify a hinge angle a as described above with respect to FIG. 2A to determine the mechanical state of the surface of display 130. Once the mechanical state of the surface of display 130 has been determined, display controller 135 may access the surface maps stored in display database 140 and retrieve display settings from display database 140 accordingly. In one embodiment, display controller 135 may retrieve display settings from display database 140 based on hinge angle a and surface curvature data. In another embodiment, display controller 135 may retrieve display settings from display database 140 based on surface curvature data alone.

As described above with respect to FIG. 1, display database 140 may be or include a repository for one or more LUTs corresponding to surface maps for each mechanical state, or a subset of possible mechanical states, of the surface of display 130. For example, one or more LUTs may store display settings corresponding to various states of folding, bending, or other mechanical deformation of the surface of display 130. Display settings for mechanical states not stored in the one or more LUTs may be interpolated from display settings corresponding to mechanical states of adjacent pixels within a display zone. For instance, display controller 135 may interpolate display settings for a pixel within display zone H of display panel 200-1 illustrated in FIG. 2B from display settings for adjacent pixels with display zone H given that pixels within display zone H are likely impacted by similar forces. As such, fewer display settings may be stored in display database 140, thus reducing the overall number of data points required for managing visual uniformity in display 130 across pixels within display 130. Upon retrieving the display settings corresponding to the surface map for the mechanical state of the surface of display 130, display controller 135 may cause the pixels within display 130 to illuminate using the display settings. In one embodiment, display controller 135 may cause only the pixels within the display zone of display 130 being viewed by a user to illuminate using the display settings, thus increasing overall energy efficiency of display 130. For example, display controller 135 may cause the pixels within display zone H of display 130 shown in FIG. 2B to illuminate using the display settings while pixels within the remaining display zones of display 130 illuminate using existing and/or user-selected display settings.

In one embodiment, display 130 may refrain from rendering images within certain display zones according to a mechanical state of the surface of display 130. In particular, display controller 135 may determine that a mechanical state of the surface of display 130 includes folding and/or bending within display zones that typically results from display 130 being held by a user. In the example illustrated in FIG. 2B, this mechanical state of the surface of display 130 may include folding and/or bending within display zones A, G, and M of display panel 200-1 (i.e., caused by a left hand of the user) and display zones F, L, and R of display panel 200-2 (i.e., caused by a right hand of the user). In response to determining that a mechanical state of the surface of display 130 likely results from being held by a user, display controller 135 may refrain from causing the pixels within the impacted display zones from illuminating. In this way, display controller 135 may increase overall energy efficiency of display 130 for instances in which certain display zones may be covered, or otherwise obstructed, by a user.

FIG. 2C is a block diagram of selected elements of an embodiment of a foldable display and multiple viewing positions of a user. In the embodiment illustrated in FIG. 2C, display 130 may be comprised of a flexible material (e.g., a plastic substrate) allowing display 130 to fold, or rotate, about hinge 210 at hinge angle a while allowing display panels 200-1 and 200-2 to become mechanically deformed. In the top-down perspective illustrated in FIG. 2C, multiple viewing positions A-D of user 250 are shown. It is noted that FIG. 2C is shown in simplified, schematic format for purposes of illustrating a clear example and other embodiments may include additional, fewer, and/or different viewing positions than those shown in the embodiment illustrated in FIG. 2C.

As illustrated in FIG. 2C, user 250 may be positioned in front of display 130 (along the z axis) in one of multiple viewing positions A-D. Here, differences in viewing positions of user 250 in relation to display 130 may cause some portions of display 130 to appear irregular in brightness and/or color settings with respect to other portions of display 130. In particular, some portions of display 130 may appear dimmer in brightness and/or duller in color than other portions of display 130 for a given viewing position. For example, when user 250 is located in viewing position D and user 250 views portion 260 of display 130 at acute viewing angle c, the angular direction of light emitted from respective pixels within portion 260 may be directed away from the location of user 250 at viewing position D. This viewing angle of user 250 at viewing position D may cause portion 260 of display 130 to appear irregular, or nonuniform, with respect to brightness and color settings of adjacent portions of display panel 200-2. Conversely, some portions of display 130 may appear brighter and/or more vivid in color as the viewing position of user 250 changes in relation to the surface of display 130. For example, when user 250 is located in viewing position A and user 250 views the same portion 260 of display 130 at orthogonal viewing angle b, the angular direction of light emitted from respective pixels within portion 260 may now be directed toward the location of user 250 at viewing position A. This viewing angle of user 250 at viewing position A may cause portion 260 to appear brighter and more vivid in color in relation to brightness and color settings of adjacent portions of display panel 200-2. Thus, irregularities in brightness and/or color settings of display 130 may vary based on differences in viewing positions of a user.

To compensate for irregularities in appearance caused by different viewing angles of user 250 at multiple viewing positions A-D, display controller 135 may cause pixels within display 130 to illuminate using display settings corresponding to respective viewing positions. Because display 130 may be comprised of a flexible material in the embodiment illustrated in FIG. 2C, display controller 135 may use the surface curvature data generated by sensors 145 (shown in FIG. 1) and hinge angle a to determine the mechanical state of the surface of display 130 as described above with respect to FIG. 2B. In addition, display controller 135 may identify a viewing position of user 250 in relation to the surface of display 130. As described above with respect to FIG. 1, camera 150 may be or include a webcam operable to capture one or more images of a user of information handling system 100. Here, display controller 135 may use one or more images of user 250 captured by camera 150 to identify a viewing position of user 250 in relation to the surface of display 130. That is, display controller 135 may identify an exact 3-axis (e.g., x, y, and z axis) viewing position of user 250 in relation to the surface of display 130. In one embodiment, display controller 135 may additionally identify a gaze direction of the user (e.g., based on eye/facial tracking data captured by camera 150). Once the viewing position of user 250 has been identified, display controller 135 may access the surface maps stored in display database 140 and retrieve display settings from display database 140 accordingly. In one embodiment, display controller 135 may retrieve display settings from display database 140 based on hinge angle a, surface curvature data, and viewing position. In another embodiment, display controller 135 may retrieve display settings from display database 140 based on hinge angle a and viewing position alone.

As described above with respect to FIG. 1, display database 140 may be or include a repository for one or more LUTs corresponding to surface maps for each viewing position, or a subset of possible viewing positions, of a user in relation to the surface of display 130. For example, one or more LUTs may store display settings corresponding to viewing positions of the user in relation to the surface of display 130 based on a user position and/or eye/facial tracking data captured by camera 150. In one embodiment, display settings for viewing positions not stored in display database 140 may be interpolated from display settings corresponding to adjacent viewing positions. In the example illustrated in FIG. 2C, display controller 135 may interpolate display settings for viewing position C from respective display settings for viewing positions B and D. In another embodiment, display settings for viewing positions not stored in display database 140 may simply default to the display settings associated with the position of user 230 at fixed distance d (shown in FIG. 2A). Here, fewer display settings may be stored in display database 140, thus reducing the overall number of data points required for managing visual uniformity in display 130 across multiple viewing positions. Upon retrieving the display settings corresponding to the surface map for the viewing position of user 250, display controller 135 may cause the pixels within display 130 to illuminate using the display settings. In one embodiment, display controller 135 may cause only the pixels within the portion of display 130 being viewed by user 250 to illuminate using the display settings, thus increasing overall energy efficiency of display 130. For example, display controller 135 may cause the pixels within portion 260 of display 130 shown in FIG. 2C to illuminate using the display settings while pixels within the remaining portions of display 130 illuminate using existing and/or user-selected display settings.

FIG. 3 is a flowchart depicting selected elements of an embodiment of a method for managing visual uniformity in a foldable display. It is noted that certain operations described in method 300 may be optional or may be rearranged in different embodiments.

Method 300 may begin at step 310, where the display controller may identify a hinge angle of the foldable display. The hinge angle may indicate a degree to which the foldable display is opened or closed. For example, display controller 135 may identify a hinge angle a of display 130 as shown in FIGS. 2A and 2C. In step 320, the display controller may receive surface curvature data from sensors indicating a mechanical state of a surface of the foldable display. For example, display controller 135 may receive surface curvature data generated by sensors 145 shown in FIG. 1. In step 330, the display controller may access surface maps stored in a display database. Each of the surface maps may indicate display settings associated with a respective mechanical state of the surface of the foldable display. For example, display controller 135 may access surface maps stored in display database 140 shown in FIG. 1. In step 340, the display controller may retrieve the display settings from the display database based on the hinge angle and the surface curvature data. For example, display controller 135 may retrieve display settings based on hinge angle a shown in FIGS. 2A and 2C and surface curvature data generated by sensors 145 shown in FIG. 1. In step 350, the display controller may cause pixels within the foldable display to illuminate using the display settings. For example, display controller 135 may cause pixels within display 130 to illuminate using display settings as described above with respect to FIGS. 2A, 2B, and 2C.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A foldable display for an information handling system, the foldable display comprising:
    a display database; a plurality of pixels;
    a plurality of sensors;
    a display controller; and
    a memory medium coupled to the display controller that includes instructions executed by the display controller causing the foldable display to:
        identify a hinge angle of the foldable display, the hinge angle indicating a degree to which the foldable display is opened or closed;
        receive surface curvature data from the plurality of sensors, the surface curvature data indicating a mechanical state of a surface of the foldable display;
        access a plurality of surface maps stored in the display database, each of the plurality of surface maps indicating one or more display settings associated with a respective mechanical state of the surface of the foldable display;
        retrieve the one or more display settings from the display database based on the hinge angle and the surface curvature data; and
        cause a subset of pixels of the plurality of pixels to illuminate using the one or more display settings, including:
            identify a first brightness level of the subset of pixels;
            determine an updated brightness level of the subset of pixels based on i) the first brightness level of the subset of pixels and ii) an increase in brightness level for the subset of pixels indicated by the one or more display settings;
            compare the updated brightness level of the subset of pixels to a maximum brightness level;
            determine, based on the comparing, that the updated brightness level of the subset of pixels is greater than the maximum brightness level, and in response:
                decrease the first brightness level of the plurality of pixels to a second brightness level less than the first brightness level; and
                update the second brightness level of the subset of pixels based on the increase in brightness level indicated by the one or more display settings.

2. The foldable display of claim 1, wherein the instructions further cause the foldable display to:
  identify a viewing position of a user in relation to the surface of the foldable display;
  retrieve one or more additional display settings from the display database based on the viewing position of the user; and
  cause the plurality of pixels to illuminate using the one or more additional display settings.

3. The foldable display of claim 1, wherein the one or more display settings include a brightness setting and a color setting.

4. The foldable display of claim 1, wherein each of the plurality of surface maps stored in the display database corresponds to a respective hinge angle of a plurality of hinge angles of the foldable display.

5. The foldable display of claim 1, wherein the foldable display includes a plurality of display zones, each of the plurality of display zones encompassing a portion of the plurality of pixels of the foldable display.

6. The foldable display of claim 5, wherein each of the plurality of display zones includes a sensor of the plurality of sensors, the sensor embedded underneath the surface of the foldable display.

7. A method for managing visual uniformity in a foldable display for an information handling system, the method comprising:
  identifying, by a display controller of the foldable display, a hinge angle of the foldable display, the hinge angle indicating a degree to which the foldable display is opened or closed;
  receiving, by the display controller, surface curvature data from a plurality of sensors of the foldable display, the surface curvature data indicating a mechanical state of a surface of the foldable display;
  accessing, by the display controller, a plurality of surface maps stored in a display database of the foldable display, each of the plurality of surface maps indicating one or more display settings associated with a respective mechanical state of the surface of the foldable display;
  retrieving, by the display controller, the one or more display settings from the display database based on the hinge angle and the surface curvature data; and
  causing, by the display controller, a subset of pixels of a plurality of pixels to illuminate using the one or more display settings, including:
    identifying a first brightness level of the subset of pixels;
    determining an updated brightness level of the subset of pixels based on i) the first brightness level of the subset of pixels and ii) an increase in brightness level for the subset of pixels indicated by the one or more display settings;
    comparing the updated brightness level of the subset of pixels to a maximum brightness level;
    determining, based on the comparing, that the updated brightness level of the subset of pixels is greater than the maximum brightness level, and in response:
      decreasing the first brightness level of the plurality of pixels to a second brightness level less than the first brightness level; and
      updating the second brightness level of the subset of pixels based on the increase in brightness level indicated by the one or more display settings.

8. The method of claim 7, further comprising:
  identifying a viewing position of a user in relation to the surface of the foldable display;
  retrieving one or more additional display settings from the display database based on the viewing position of the user; and
  causing the plurality of pixels to illuminate using the one or more additional display settings.

9. The method of claim 7, wherein the one or more display settings include a brightness setting and a color setting.

10. The method of claim 7, wherein each of the plurality of surface maps stored in the display database corresponds to a respective hinge angle of a plurality of hinge angles of the foldable display.

11. The method of claim 7, wherein the foldable display includes a plurality of display zones, each of the plurality of display zones encompassing a portion of the plurality of pixels of the foldable display.

12. The method of claim 11, wherein each of the plurality of display zones includes a sensor of the plurality of sensors, the sensor embedded underneath the surface of the foldable display.

13. A computing environment, comprising:
  an information handling system including one or more processors; and
  a foldable display including:
    a display database;
    a plurality of pixels;
    a plurality of sensors;
    a display controller; and
    a memory medium coupled to the display controller that includes instructions executed by the display controller causing the foldable display to:
      identify a hinge angle of the foldable display, the hinge angle indicating a degree to which the foldable display is opened or closed;
      receive surface curvature data from the plurality of sensors, the surface curvature data indicating a mechanical state of a surface of the foldable display;
      access a plurality of surface maps stored in the display database, each of the plurality of surface maps indicating one or more display settings associated with a respective mechanical state of the surface of the foldable display;
      retrieve the one or more display settings from the display database based on the hinge angle and the surface curvature data; and
      cause a subset of pixels of the plurality of pixels to illuminate using the one or more display settings, including:
        identify a first brightness level of the subset of pixels;
        determine an updated brightness level of the subset of pixels based on i) the first brightness level of the subset of pixels and ii) an increase in brightness level for the subset of pixels indicated by the one or more display settings;
        compare the updated brightness level of the subset of pixels to a maximum brightness level;
        determine, based on the comparing, that the updated brightness level of the subset of pixels is greater than the maximum brightness level, and in response:
          decrease the first brightness level of the plurality of pixels to a second brightness level less than the first brightness level; and update the second brightness level of the subset of pixels based on the increase in brightness level indicated by the one or more display settings.

14. The computing environment of claim 13, wherein the instructions further cause the foldable display to:
identify a viewing position of a user in relation to the surface of the foldable display;
retrieve one or more additional display settings from the display database based on the viewing position of the user; and
cause the plurality of pixels to illuminate using the one or more additional display settings.

15. The computing environment of claim 13, wherein the one or more display settings include a brightness setting and a color setting.

16. The computing environment of claim 13, wherein each of the plurality of surface maps stored in the display database corresponds to a respective hinge angle of a plurality of hinge angles of the foldable display.

17. The computing environment of claim 13, wherein the foldable display includes a plurality of display zones, each of the plurality of display zones encompassing a portion of the plurality of pixels of the foldable display.

* * * * *